Dec. 5, 1939.  J. H. LOWE ET AL  2,182,671
DEVICE FOR USE IN MAKING PIPE JOINTS
Filed May 1, 1939  3 Sheets-Sheet 1
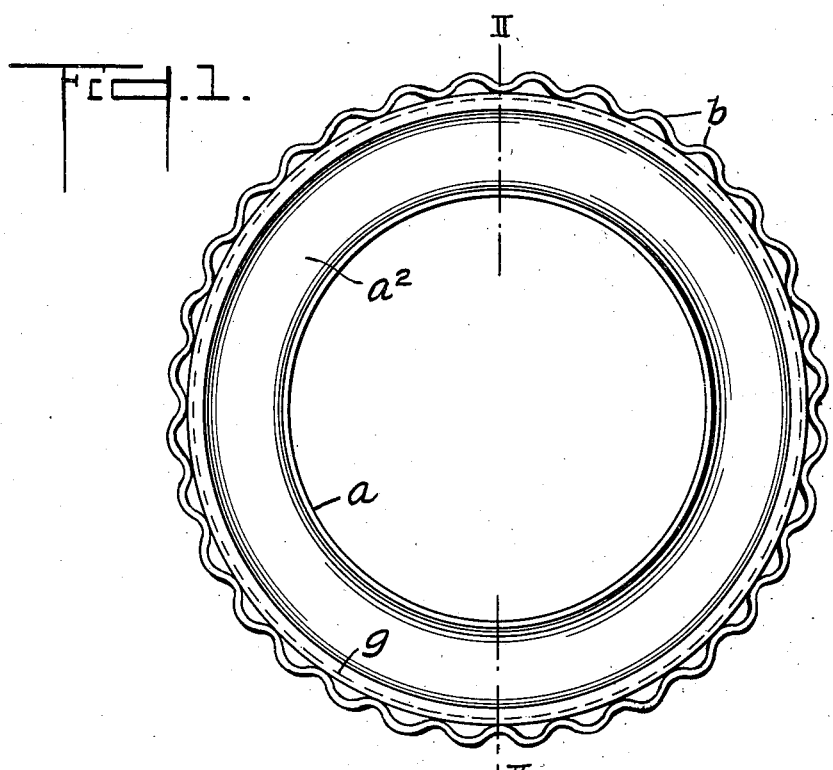
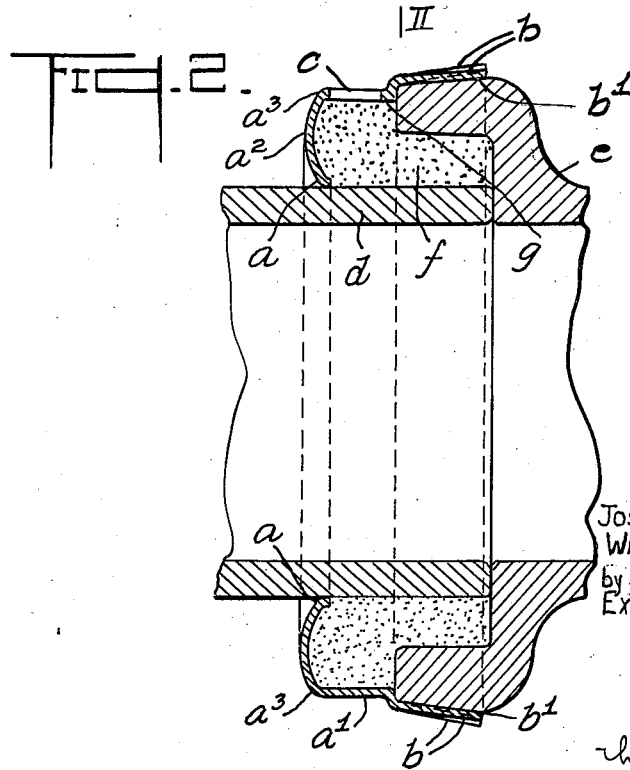
Joseph Henry Lowe and
William King, deceased
by Ian Waveney Girvan,
Executor.
INVENTORS
BY
ATTORNEY.

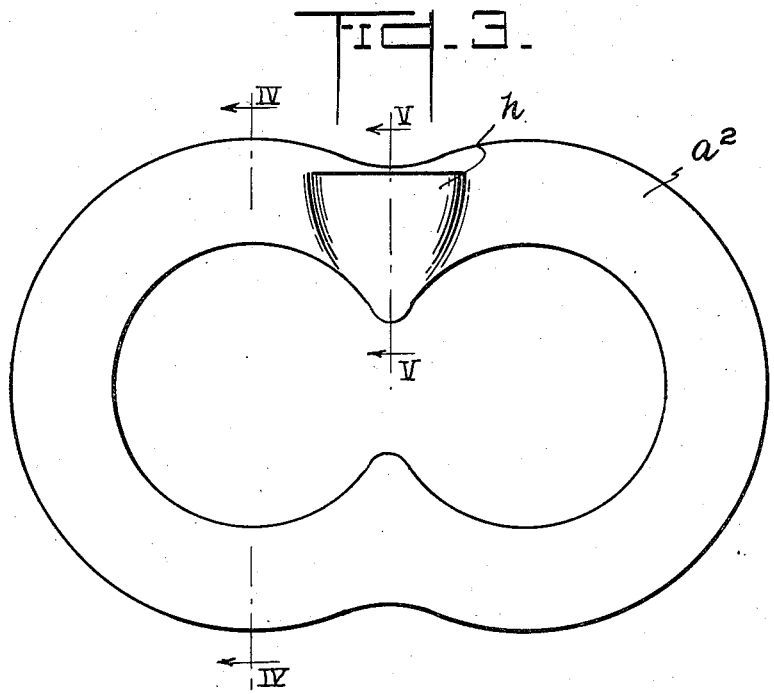
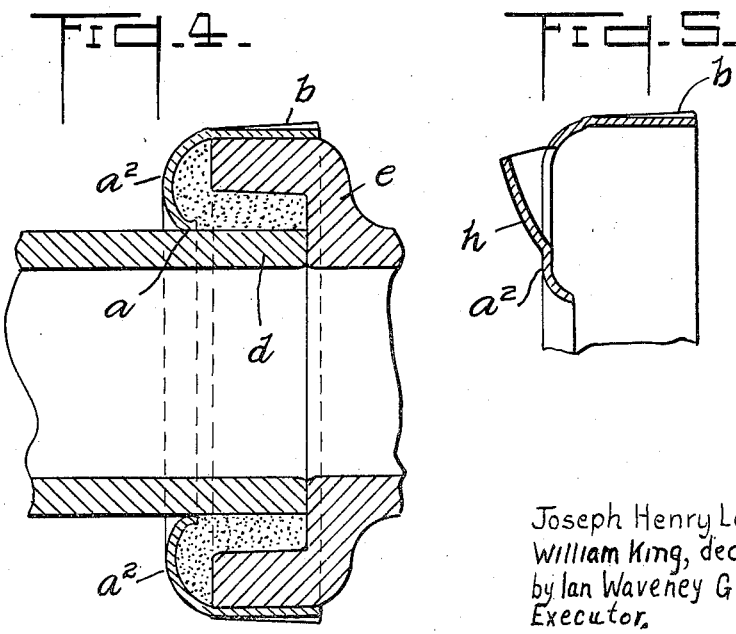

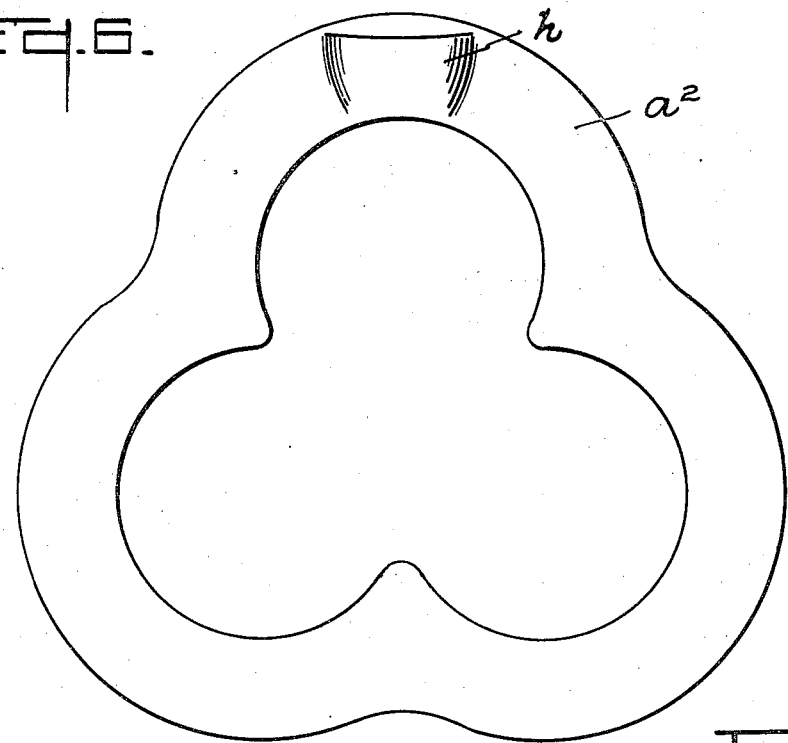
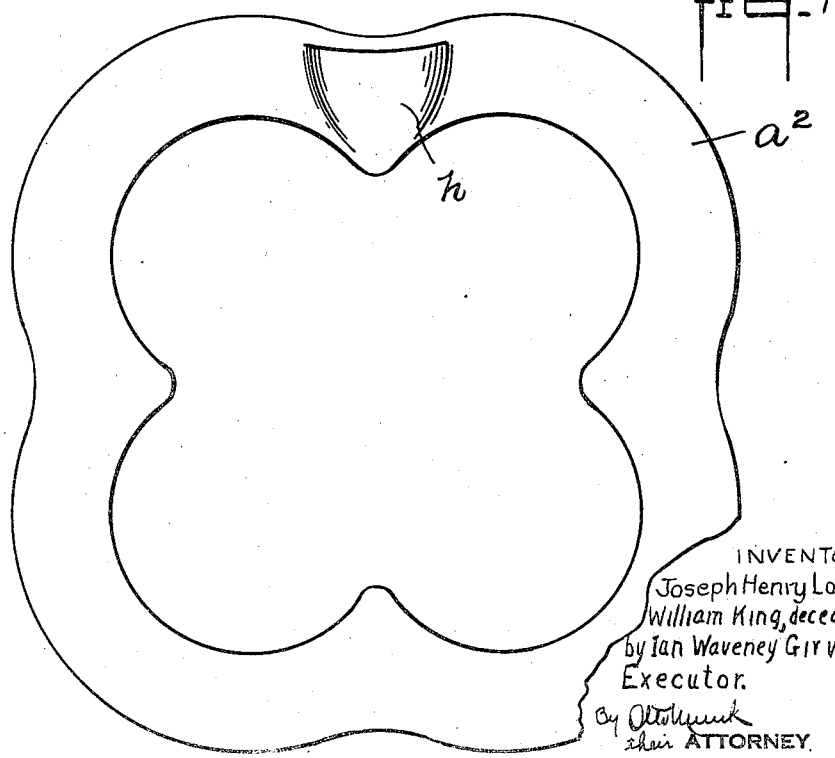

Patented Dec. 5, 1939

2,182,671

UNITED STATES PATENT OFFICE 2,182,671

DEVICE FOR USE IN MAKING PIPE JOINTS

Joseph Henry Lowe, Eastcote, Pinner, England, and William King, deceased, late of Eastcote, Ruislip, England, by Ian Waveney Girvan, executor, Denham Village, England, assignors to The Pipe-Joint Manufacturing Company Limited, London, England, a British company Application May 1, 1939, Serial No. 271,132
In Great Britain August 3, 1937

1 Claim. (Cl. 285—119)

This invention relates to improvements in devices for use in making pipe joints of the type consisting of a one-piece shroud which is adapted to be applied around the abutting pipe-ends and to receive and hold in place the joint-making material while the joint is being made, one end of the shroud being adapted to receive the socket while the other end is adapted to receive the spigot. The invention is intended for application primarily to the spigot and socket joints of pipes for drainage, sanitary and analogous purposes.

Now, there are several matters to be considered where pipes of the spigot and socket type for drainage and sanitation purposes are to be laid in a trench, amongst which may be mentioned; first, that the spigot of the one pipe has to be centered with respect to the socket of its neighbour; secondly, that after bonding has been completed the trench may become flooded and the bonding material, if concrete, washed out or damaged; thirdly, that the trench cannot be filled in before the bonding material has set as the alignment of the pipes might otherwise be spoiled and it follows that if the trench is in sandy or loose soil there may be caving-in, and perhaps damage to neighbouring structures.

The object of the present invention is to obviate any trouble arising from the above-mentioned matters.

According to this invention, the peripheral edge of the spigot end of the shroud is inturned towards the socket-end so that it makes a tight joint with the spigot end of the pipe thereby ensuring correct and automatic centering of the pipe-ends. The inturned edge also imparts a certain degree of flexibility to the spigot end of the shroud so that it can readily accommodate itself to irregularities and slightly varying diameters of the pipe spigot. Further, it prevents exudation of the jointing material from the shroud.

A further feature of the invention consists in the provision of corrugations in the socket end of the shroud whereby it is enabled to accommodate itself to irregularities in the exterior surface and, to some extent, variations in the external diameter or shape of the socket, the corrugations further serving to resist any tendency to undue deformation of the shroud.

The shroud may be circular or shaped to adopt it to the exterior shape of the pipes to be joined together as, for example, with multi-conduit pipes.

A still further feature of the invention as applied to single conduit pipes of circular cross-section consists in the provision, at a point about midway between the ends of the shroud, of a circumferential shoulder or stop which is adapted to abut against the open end of the socket and thereby correctly position the shroud on the pipe-socket and acting as a stiffener to prevent distortion of the shroud.

In order that the invention may be clearly understood and more readily carried into effect, we will proceed to to describe the same with reference to the accompanying drawings, wherein:

Figure 1 is an end elevation of the shroud for a single conduit pipe of circular cross-section as seen from its socket-end.

Figure 2 is a section on line II—II of Figure 1 shown as in position on the ends of adjoining pipes, Figure 3 is an end elevation of a shroud for a double-conduit pipe, Figure 4 is a section on the line IV—IV of Figure 3 showing the shroud in position of the ends of adjoining pipes, Figure 5 is a section on the line V—V shown on an enlarged scale, Figure 6 is an end elevation of a shroud for a three-conduit pipe, and Figure 7 is an end elevation of a shroud for a four-conduit pipe.

Referring to the drawings in which like parts bear like reference letters, and in particular to Figures 1 and 2 thereof, the peripheral edge of the spigot-end of the shroud is inturned as at $a$ and the socket end is corrugated as at $b$, the corrugations preferably being of V-form with the apex pointing away from the edge of the shroud. $c$ is an aperture in the shroud through which cementitious or bituminous jointing material is to be introduced. The spigot and socket of the pipes are shown at $d$ and $e$ respectively and the jointing material is shown at $f$. The inturned edge $a$ which preferably yields slightly, facilitates entry of the spigot-end $d$ of the pipe into the shroud and prevents spewing of the jointing material $f$. The shroud may be provided with one or more weep holes for the escape of any free liquid from the jointing material. The shape of the shroud between the parts $a$ and $b$ is immaterial so long as it permits of the introduction of sufficient jointing material to make the pipe-joint. It is preferable, however, to shape its spigot-end as shown, namely, substantially of L-form in cross-section, the portion $a^1$ being horizontal and the portion $a^2$ being in the form of an outwardly curved inwardly extending flange which latter, being substantially at right-angles to the axis of the shroud, serves to stiffen the shroud and resist its deformation. Although the flange portion $a^2$ acts as a stiffener to the shroud as a whole, it is nevertheless slightly yieldable about the bend $a^3$ thereby further facilitating the introduction of the spigot-end $d$ of the pipe into the shroud. The entry is still further facilitated by the outward curving of the flange $a^2$. The corrugations $b$ in the socket-end of the shroud are preferably continued all around the socket but they may, in some cases, be formed only at intervals around the socket. The mouth of the socket of the shroud is slightly flared and is preferably beveled as at $b^1$ so as to ease its passage on to the socket of the pipe. $g$ is a localising shoulder in the shroud against which the open end of the pipe socket abuts as shown. The shoulder, being disposed at right angles to the axis of the shroud, serves also as a stiffener to resist deformation of the shroud.

The shroud adapted for joining two conduit pipes is shown in Figures 3 to 5 in which case it is substantially 8 shape being formed as two portions, i. e., the curved portion $a^2$ with the inturned edge $a$ and the portion with the corrugations $b$. The aperture conforms to the exterior shape of the spigot end of a pipe and, similarly, the corrugated portion conforms to the shape of the collar of this type of pipe. A filling aperture $c^1$ is provided in the portion $a^2$ and is bounded by a lip $h$ for facilitating the entry of the cementitious or bituminous bonding material.

As applied to a three-conduit pipe, the shroud, as may be seen from Figure 6, is substantially clover-leaf shape, the lip $h$ being at the highest point. The shroud for a four-conduit pipe, Figure 7, is substantially a duplication of the shroud for a two-conduit pipe. In both these cases, as in the example of a shroud for a two-way conduit, the shape of the shroud conforms to the shape of the spigot and collar ends of the pipe and comprises the curved and corrugated portions.

The shroud not only varies its shape to suit the pipes with which it is intended to be used, but its size will also be varied to suit the particular size of pipe with which it is intended to be used.

The shroud is preferably moulded from papier mâché, which may be waterproofed, or from a synthetic resinous material. It may, however, be stamped up from sheet metal or other suitable known material.

The joint having been made, the shroud may be left on it so as to shield it against harmful atmospheric influence or damage before the pipes are adequately covered and against other possible damage after they are covered.

By means of the shroud, time is saved in laying the pipes, the joints may be the sooner inspected by the sanitary inspector, and the trench can be filled in with the minimum of delay which is an important consideration if it has been dug in loose or sandy soil with the consequent risk of caving in.

We claim:

A one piece shroud for use in joining spigot and socket pipes formed with an inwardly curled portion adapted to grip the spigot and with a corrugated portion adapted to fit onto the collar, an aperture being provided for the introduction of bonding material.

JOSEPH HENRY LOWE.
IAN WAVENEY GIRVAN,
*Executor of the Estate of William King, Deceased.*